(12) United States Patent
Littley et al.

(10) Patent No.: US 11,029,239 B2
(45) Date of Patent: Jun. 8, 2021

(54) TEST APPARATUS AND METHOD FOR TESTING DUST SUPPRESSION SYSTEMS

(71) Applicant: Fuchs Petrolub SE, Mannheim (DE)

(72) Inventors: Paul Roger Littley, Alsager (GB); John Stirland, Mansfield (GB)

(73) Assignee: Fuchs Petrolub SE, Mannheim (DE)

( * ) Notice: Subject to any disclaimer, the term of this patent is extended or adjusted under 35 U.S.C. 154(b) by 139 days.

(21) Appl. No.: 16/326,472

(22) PCT Filed: Aug. 24, 2017

(86) PCT No.: PCT/IB2017/001016
§ 371 (c)(1),
(2) Date: Feb. 19, 2019

(87) PCT Pub. No.: WO2018/037275
PCT Pub. Date: Mar. 1, 2018

(65) Prior Publication Data
US 2019/0271628 A1     Sep. 5, 2019

Related U.S. Application Data

(63) Continuation-in-part of application No. PCT/IB2016/001190, filed on Aug. 24, 2016.

(51) Int. Cl.
*G01N 13/00*     (2006.01)
*G01N 15/14*     (2006.01)
(Continued)

(52) U.S. Cl.
CPC .............. *G01N 13/00* (2013.01); *G01M 9/04* (2013.01); *G01M 99/00* (2013.01); *G01N 15/14* (2013.01);
(Continued)

(58) Field of Classification Search
CPC .... G01N 17/00; G01N 17/002; G01N 17/008; G01N 13/00; G01N 15/14;
(Continued)

(56) References Cited

U.S. PATENT DOCUMENTS 2,346,690 A * 4/1944 Larkins, Jr. .................. 73/865.6
5,381,701 A * 1/1995 Frankenthal ....... G01R 31/2817
73/865.6
(Continued)

FOREIGN PATENT DOCUMENTS

CN          1704746      12/2005
CN     105 067 773      11/2015
(Continued)

OTHER PUBLICATIONS

Swanson J-G.: Untersuchung über die Auswirkung verschiedener Bedüsungssysteme auf die Staubbindung, das Klima und den Wassergehalt von Kohle; www.bergbau.tu-claustahl.de/fachabteilungen/tiefbau/projekte/abgeschlossen/untersuchungen-ueber-die-auswirkung-verschiedener-beduesungssysteme-auf-die-staubbindung-das-klima-und-den-Wassergehalt-von-Kohle; Technische Universität Clausthal, Germany; project start in 2006; discussed in instant specification, p. 1, 2nd paragraph.

(Continued)

*Primary Examiner* — Justin N Olamit
(74) *Attorney, Agent, or Firm* — Gudrun E. Huckett (57) ABSTRACT

The invention as herein described discloses a test apparatus (1) for testing dust suppression systems and a method for testing dust suppression systems using said test apparatus (1). Said test apparatus (1) comprises a housing (100) with at least two chambers (101,102) being separated from each other by a window (103) which comprises at least one transfer vent (104). Therein particle counting means (110, 120) are detachably mounted to at least one of said two (Continued)

chambers (101,102). Further, the first chamber (101) of said at least two chambers (101,102) comprises a door (121) and is equipped with supply means for supplying the first chamber (101) with particulate free air, and wherein the second chamber (102) of said at least two chambers (101, 102) is equipped with exit means for releasing air from the second chamber (102).

19 Claims, 4 Drawing Sheets

(51) Int. Cl.
    *G01N 17/00*     (2006.01)
    *G01M 9/04*     (2006.01)
    *G01M 99/00*     (2011.01)

(52) U.S. Cl.
    CPC ... *G01N 17/002* (2013.01); *G01N 2015/1486* (2013.01)

(58) Field of Classification Search
    CPC .. G01N 2015/1486; G01M 3/00; G01M 9/02; G01M 9/04; G01M 99/00
    See application file for complete search history.

(56) References Cited

U.S. PATENT DOCUMENTS

| | | | | |
|---|---|---|---|---|
| 6,446,517 | B1* | 9/2002 | Sharma | G01N 17/002 73/865.6 |
| 7,212,977 | B2* | 5/2007 | Tsuji | H01L 21/67276 705/63 |
| 7,682,574 | B2* | 3/2010 | Chiu | F23N 5/242 422/108 |
| 8,274,038 | B2* | 9/2012 | Cranfill, III | G01N 15/06 250/222.2 |
| 8,733,186 | B2* | 5/2014 | Lehman | G01N 17/002 73/865.6 |
| 9,752,975 | B2* | 9/2017 | Mendelovici | G01N 15/0205 |
| 10,281,356 | B2* | 5/2019 | Matsumoto | G01M 7/06 |
| 2014/0004559 | A1 | 1/2014 | Hill et al. | |
| 2015/0377764 | A1 | 12/2015 | Pan | |

FOREIGN PATENT DOCUMENTS

| | | |
|---|---|---|
| JP | 2011257178 | 12/2011 |
| RU | 2 140 066 | 10/1999 |
| RU | 2 403 393 | 3/2010 |
| RU | 2 580 103 | 3/2016 |
| WO | 2010/004120 | 1/2010 |

OTHER PUBLICATIONS

Faschingleitner, J. et al.: "Evaluation of primary and secondary fugitive dust suppression methods using enclosed water spraying systems at bulk solids handling"; Advanced Powder Technology 22 (2011); pp. 236-244 (XP029384054).

Martin Engineering: "Preventing dust in material handling operation"; Martin News & Press; Neponset, IL, USA; Aug. 2, 2016; pp. 1-4 (XP055491539).

Copeland., C. R. et al.: "Design of a dust tower for suppression of airborne particulates for iron making"; Minerals Engineering 24 (2011); pp. 1459-1466 (XP028299410).

Mendez Mariano J et al.: "A new dust generator for laboratory dust emission studies"; Aeolian Research 8 (2012); pp. 59-64 (XP028973138).

Wang, Hong: "Research on Application of Wind Proofing and Dust Supressing Wall in Hanfeng Power Plant"; Chinese Master's Theses Full-text Database Engineering Science and Technology I, vol. 3, pp. 1-4; Mar. 15, 2015.

* cited by examiner

TEST APPARATUS AND METHOD FOR TESTING DUST SUPPRESSION SYSTEMS

BACKGROUND OF THE INVENTION

The invention relates to a test apparatus for testing dust suppression systems and a method using same.

Dust suppression in air is a topic of high relevance, in particular with regard to human health. Several dust suppression methods have been described. Well known is dust binding by use of water spray nozzles; see webpage of Clausthal University of Technology, Germany, at bergbau.tu-clausthal.de/fachabteilungen/tiefbau/projekte/abgeschlossen/untersuchung-ueber-die-auswirkung-verschiedener-b eduesungssysteme-auf-die-staubbindung-das-klima-und-den-wassergehalt-der-kohl e/. This webpage further explains methods of testing the effectiveness of said spraying and uses wind tunnel testing laboratories for this purpose.

Other efforts for suppressing dust release have been directed in developing surface coatings and fluids. The current state of the art with regard to these surface coatings and fluids relies on gravimetric measurements of dust on these coatings and in the fluids. Releasable dust is transferred from coatings and fluids to a filter, then the amount of particles in the filter is measured by weighing said filter.

Based on this state of the art, it is an object of the invention to provide a device representing an easy to handle, reliable and complete system taking into account factors that influence emission of dust and thus allowing to simulate different real environmental conditions with regard to dust release.

SUMMARY OF THE INVENTION

These objects are achieved with the test apparatus for testing dust suppression systems comprising a housing with
  two chambers being separated from each other by a window which comprises at least one transfer vent, wherein
  particle counting means are detachably mounted to at least one of the two chambers,
  and wherein
  the first chamber of the at least two chambers comprises a door and is equipped with supply means for supplying the first chamber with particulate free air, and wherein
  the second chamber of the at least two chambers is equipped with exit means for releasing air from the second chamber.

A further object is to provide an improved method for testing dust suppression systems.

This object is achieved with the method using a test apparatus as described with testing dust suppression systems, the method comprising the steps of:
  a) providing the housing with chambers and
  b) placing the dust comprising object inside the first chamber,
  c) providing a particulate free air flow into the first chamber, thereby disturbing releasable dust particulates from the dust comprising object, and providing an airflow comprised of the particulate free air flow and airborne dust particulates,
  d) allowing airflow to pass the transfer vent in a controlled way, thereby entering the second chamber,
  e) with the meanwhile activated particle counter at second chamber quantifying dust particulates in the airflow, and, from the number of quantified particulates in relation to the amount of dust particulates,
  f) concluding efficiency of the dust retention of the test object comprising dust.

Preferred embodiments of the apparatus and the method are specified in the dependent claims.

A first embodiment of the test apparatus for testing dust suppression systems comprises a cabinet having two adjacent chambers being separated from each other by a window which comprises at least one transfer vent. To one or both of said two chambers particle counting means are detachably mounted. Further, the first chamber of said two chambers has a door and is equipped with supply means for supplying the first chamber with particulate free air. The second chamber of said two chambers is equipped with exit means for releasing air from the second chamber.

"Dust" herein shall be understood as any particulate material of small sizes, such as particles in the range under 20 μm, preferably even below. The dust can be composed of any material. Dust particulates may be classified in size ranges, ranging from 0 to 1 μm, over 1 μm to 2.5 μm, over 2.5 μm to 5 μm and from over 5 μm to 10 μm, e.g. this is just an example—other ranges may be selected.

"Dust suppression systems" herein shall be understood as any means such as specific surfaces of objects, coatings for objects, specifically treated subjects or fluids which are particularly designed and adapted to retain as much as possible dust once brought in contact with the aforementioned.

"Window" for separating the adjacent chambers herein means "dividing wall" and may be a double or a single window or wall, respectively, and, additionally, may be framed and may be displaceable, thereby providing adjacent chambers with variable inner volumes.

The particle counting means being attached "to" one or both of said two chambers means that said particle counting means can be arranged inside or outside of the respective chamber. So, it comprises in, at, on. It may be wished to arrange an optical particle counting means outside the housing e.g. other apparatuses for particle counting may better be installed inside the chamber wherein it is needed.

"Door" of the first chamber of said two chambers means any kind of sealable opening in a wall of the chamber being of appropriate size to allow placement of objects to be tested inside the chamber.

"Particulate free air" herein shall be understood as gas or air being free of or at least being depleted of dust particles and typically no more than 50 2.5 micron sized particles shall be comprised per litre air as determined by a calibrated laser particle counter recording the average number of particles when sampled for 1 minute. The cleanliness level being similar to ISO 4644-1 clean room standard ISO 9.

According to a further embodiment of the invention, the test apparatus of the invention comprises air filter means. Desirably the first chamber comprises a first filter unit which is fit into a wall constituting the first chamber and the second chamber comprises a second filter unit fit into a wall constituting the second chamber. These filters are optimized, on the one hand side, to prevent dust laden air to escape from the housing and, on the other hand side, to provide a pressure balance within the chambers during measurements when air is blown into the housing. Number of filter units may be adapted to the size of the test apparatus—a large, wind-tunnel-like apparatus may need a number of filter units related to each chamber.

One or both chambers of another embodiment of the apparatus of the invention comprise a temperature measuring device. These device can be a temperature probe.

According to still another embodiment of the invention, a holding device is arranged for holding a test object comprising dust. Said holding device can be a table. In order to simulate real conditions of dust release, when a dust laden surface is moved, it can be advantageous to install a movable table; preferably one that can be vibrated and is therefore coupled to vibration means. Movement of the table—such as rotation—might be variably adjustable.

According to a further embodiment of the invention, a vibration sensor has been added to the system, so that in case the movement of the table is vibration, same can be controlled: The frequency and energy of vibration can be recorded by a transducer and logged to a PC so that the level of vibration can be recorded which provides for consistent control of the intensity of vibration. This enhancement leads advantageously to more data and control of the test.

A variable speed vibrating table may be desirable when movement of items during transport such as coal shall be simulated; probably when transported by rail car. Use of the herein described test apparatus then gives the ability to measure release of dust particulates in real time when size range and quantity of potentially respirable particulates are measured. Advantageously the dust particulates are not dangerous at any time for the adjacent environment, since they are captured in safe filter means of the housing or test cabinet system, respectively.

According to still another embodiment of the invention said dust comprising test object is a plate or a dish.

Advantageously, the holding device such as said table can be detachable or dismountable and, hence, can be removed from the chamber in order to give room for a larger test object, plate, dish, which may not need to be moved or is a self-vibrating dust laden object.

Further, the particle counting means is an optical particle counter, preferably a laser particle counter.

The housing can entirely or at least in parts be made of a transparent material, preferred made of glass or a glassy polymer, most preferred made of Poly (methyl methacrylate). The transparent material in particular is advantageous for these parts of the apparatus through which visual supervision of the test proceedings shall take place. Of course, for stability or other reasons parts of the housing may be made of metal or other non-transparent material.

It is particularly advantageous when the housing is made entirely or at least partially of a transparent material when an optical particle counter is used, as it can be located inside or outside the chamber. Further, a particle counter which is not finally fixed on or in the housing and which can be dismounted easily can be used for both chambers: First with the first chamber to perform calibration proceedings and to check cleanliness of the first chamber, and second with the second chamber in order to carry out counting measurements during any tests.

It is preferred that the supply means for supplying the first chamber with particulate free air comprise an air control valve which is coupled to a mass flow meter being fitted into a wall of the housing which constitutes the first chamber.

The person skilled in the art knows that "fitted" as used herein with regards to objects placed within the wall or in a window or door, respectively, means providing a recess, placing the object in the recess and fixing it sealed.

Upstream of the mass flow meter an air pump is arranged to supply the mass flowmeter with air. The action of pumping large volumes of air produces heat and the level can be controlled by varying the speed of the air pump motor and balancing the air flow with a control valve.

For additional cooling a radiator can be fitted between the air pump and the mass flow meter of the test apparatus. Changes in temperature of the air cause differences in drying a curing times for any coatings used. The air temperature can be varied to reflect normal ambient air conditions or be raised to higher values to accelerate testing.

This allows to controllably and with desired flow rate blow clean, particulate free air into said first chamber at known velocity and, if measured, with known temperature inside the first chamber. The blowing-in can even be optimized in that a hose is provided which is coupled to the mass flow meter and which preferably ends in a nozzle. Using a hose, in particular with such a nozzle, permits directing the incoming airflow onto the test object and therefore provoking dust release for test purposes. The hose and nozzle is semi rigid and can be moved easily to change the angle of attack of the air and distance to the test object.

In still another embodiment of the test apparatus the transfer vent is a rotating air vent which, ideally, is equipped with adjusting means to adjust velocity and air flow rate and therefore the proportion of "dirty" air carrying dust and entering the second counting chamber can be controlled.

So the test apparatus of the invention directs towards dust binding and therefore suppression system development and optimization thereof using this quantitative apparatus for the determination of the effectiveness of dust suppression fluids and coatings.

The test apparatus may be used to simulate the conditions for testing dust control systems e.g. when transporting coal, "coal toppers", and for lock down of dust in roadways and tunnels. It provides a complete system with control of the air flows and their velocity, temperature at any point of the test apparatus and it provides vibration of the dust carrying test object to simulate real use, therefore having variables which can be set to simulate different real environmental conditions. The apparatus according to the invention provides a system which can be used to easily demonstrate and educate people about the need to control dust in the environment and additionally it represents a tool for the formulators of dust suppression systems to enable speedy and cost effective quantitative analysis of the performance of such fluids and coating systems.

In relation to testing dust suppression fluids, which are applied to capture air-borne dust generated from industrial processes, such as that of longwall mining for example, the test cabinet can be easily varied. Thereby, another embodiment of the invention is provided:

The vibrating table can be replaced by a tube or spray box. Alternatively, the table or the vibrating table remains in the first chamber and the tube or spray box is placed on the table, which, in this case, must not vibrate. The dust, coal dust for example, is introduced to a second tube by Venturi effect and launched into first chamber spray box. The spray box (or tube) contains a number of jets which produces a mist of either water or water plus dust suppression chemicals under test. To do so, the jets are coupled to a water or water plus suppression chemicals providing source such as a tank or container. Coupling can be made by using tubes or hoses plus fittings.

The pressure to the spray jets is provided by means of a reservoir of clean air. An air compressor (which may in its size be adopted to the size and capacity of the test cabinet) connected to said reservoir is itself connected to a chamber holding the test fluid and by applying air pressure on said dust suppression fluid, the latter is forced through the tubing connected to the spray jets. The dust suppression fluid is forced through the jets at a stable predetermined pressure. The dust particles are wetted and "captured" by the spray and the efficiency of the dust suppression fluid under test is measured by determination of the quantity of particles, which reach the particle counter and are counted by the particle counter. In this case a suitable laser based particle counter is used which is not sensitive to particles of water being generated, to avoid false readings concerning dust levels. The effectiveness of the dust suppression system is measured by comparing the captured data from the particle counter.

Further, the invention provides a repeatable and safe method for determination of the relative efficiency of dust suppression fluids and systems.

The method for testing dust suppression systems according to a first embodiment of the invention uses the test apparatus (but the version without spray box, or in other words "dry dust cabinet") as above disclosed and comprises the steps of a) providing the housing with chambers and
b) placing the dust comprising object inside the first chamber
c) providing a first, particulate free air flow into first chamber, thereby disturbing releasable dust particulates from the dust comprising object, and providing an second air flow comprised of the particulate free air flow and air borne dust particulates,
d) allowing said second airflow to pass the transfer vent in a controlled way, thereby entering the second chamber,
e) with the meanwhile activated particle counter at the second chamber quantifying dust particulates in said second airflow, and, from number of quantified particulates in relation to amount of dust particulates comprised on dust comprising object,
f) concluding efficiency of dust retention of test object comprising dust.

This method leads to reliable results, when the housing before use is free of dust and thus clean, so that any dust background is as small as possible. To make sure about the background cleanliness of the housing the first chamber at least may be calibrated beforehand or between any measurements.

Regarding e) it must be understood, that for quantifying dust particulates in said second airflow, control tests can be done on the test object without any dust suppression system applied to the test object and the level of dust released without treatment measured. This establishes a maximum level of release of particulates from which the effectiveness of any treatment can be judged. It is also possible having an established and repeatable base level for the object, to compare the efficiency of one treatment with another. For example water versus other water based systems containing humectants or functional additives.

The calibration comprises the step b'):
before performing step b) (placing the dust comprising object inside the first chamber) performing calibration of the first chamber by placing a first particle counter at the first chamber with no test object comprising dust inside, and counting particles; thus providing the background of the first chamber.

Of course, calibration of the second chamber may be carried out the same way.

The method according to the invention may be refined in that during performance of any of steps b'), b) to e) punctually or continuously the temperature of the first and/or the second chambers is measured.

Quantification of the dust particulate laden air flow entering the second chamber via the first chamber or quantification of the dust particulates in first chamber with no test object comprising dust inside is recorded versus time. Complementary quantification can be done over at least two particulate sizes, preferably over at least three or more particulate sizes.

Recording of any of the obtained data is suggested in that the devices equipped in the test apparatus are combined with a data capture system and display to store and visualize data and display real time information on quantity and size range of airborne particles generated.

The method for testing dust suppression systems according to another embodiment of the invention uses the test apparatus comprising the spray box (wet dust cabinet) and comprises the steps of a) providing the housing with chambers and
b) placing the dust comprising object inside the first chamber
b*) introducing dust suppression fluid and launching into first chamber spray box, thereby wetting dust particulates of the dust comprising object
c) providing a first, particulate free air flow into first chamber, thereby disturbing releasable dust particulates from the dust comprising object, and providing a second air flow comprised of the particulate free air flow and air borne dust particulates,
d) allowing said second airflow to pass the transfer vent in a controlled way and to enter the second chamber,
e) with the meanwhile activated particle counter at the second chamber quantifying dust particulates in said second airflow, and, from number of quantified particulates in relation to amount of dust particulates comprised on dust comprising object,
f) concluding efficiency of dust retention of test object comprising dust.

In this method, using the "wet dust cabinet", the dust particles are wetted and "captured" by the spray and the efficiency of the dust suppression fluids under test is measured by determination of the quantity of particles, which reach and are counted by the particle counter. It is important that a suitable laser based particle counter is used which is not sensitive to particles of water generated, to avoid false readings concerning dust levels. The dust compression fluid used may be water or water plus dust suppression chemicals.

To analyse water based dust suppression fluids by capturing dust, a spray box or tube is located inside the first chamber. This spray box or tube contains spray jests. The dust suppression fluid is pumped under air pressure to the spray jet system, the spray interacts with the dust, wets it and brings it down, so reduces the level of airborne dust reaching the particle counter.

Tests can be made dry, without the spray (with "dry dust cabinet"), then with water (with "wet dust cabinet"), then with the dust suppression treated water. By comparing the area of the graph, e.g., the effectiveness of the fluid developed can be determined.

BRIEF DESCRIPTION OF THE DRAWINGS

Other objects and many of the attendant advantages of embodiments of the present invention will be readily appreciated and become better understood by reference to the following detailed description of preferred embodiments in connection with the accompanied drawing(s). Features that are substantially or functionally equal or similar will be referred to with the same reference sign(s).

DESCRIPTION OF PREFERRED EMBODIMENTS

Figure 1:
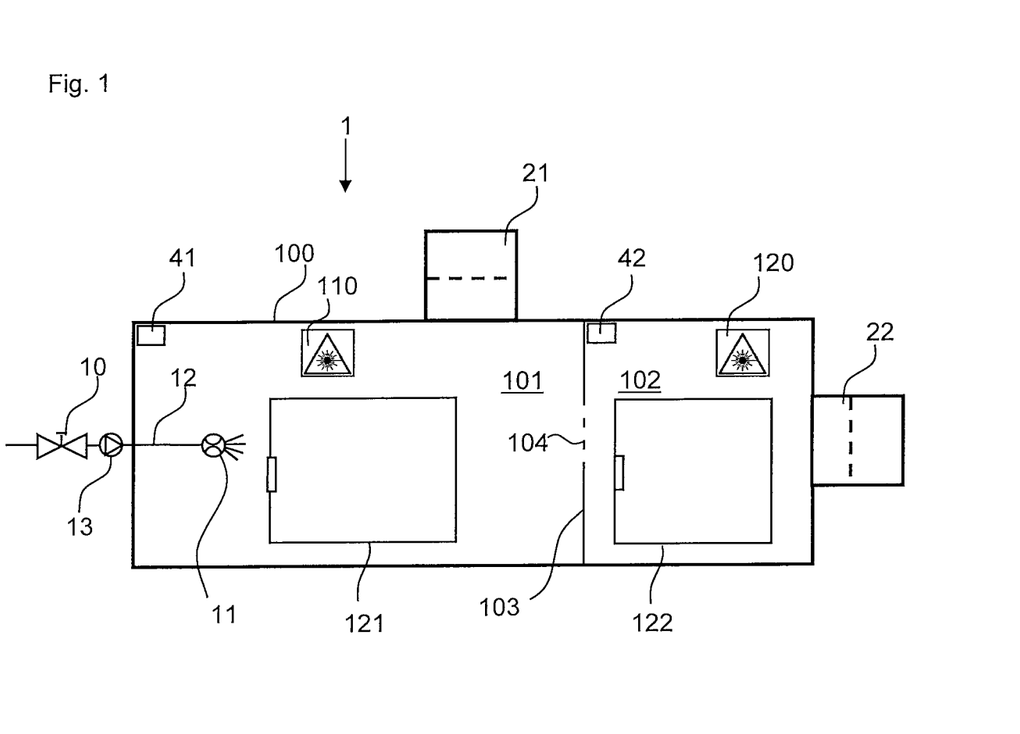
FIG. 1 shows a schematic side view of a test apparatus according to the invention with no test object in it.
Figure 2:
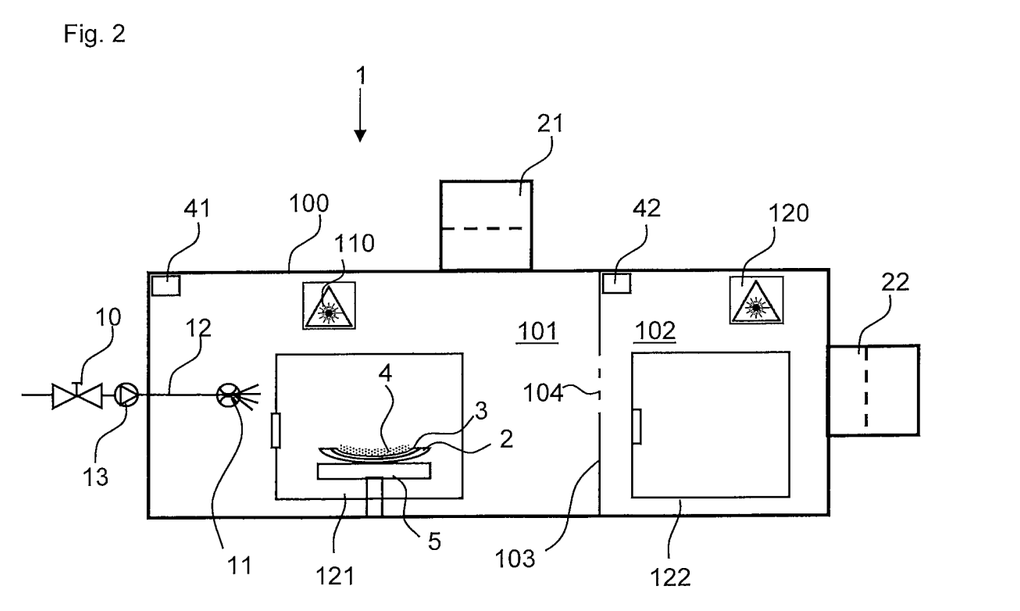
FIG. 2 shows the view of FIG. 1 with a test object inside.

The test apparatus 1 as shown in FIGS. 1 and 2 shows as housing 100 a clear, transparent Poly(methyl methacrylate) (PMMA) cabinet with the first chamber 101 being separated from the second chamber 102 by the window 103 which comprises a transfer vent 104 herein designed as an adjustable rotatable vent 104. FIGS. 1 and 2 show both chambers 101,102 housing laser particle counting means 110,120.

Of course, other materials than PMMA can be used for the housing. The housing even could be a wind tunnel or the like as long as the arrangement as herein described with said two chambers and the equipment is provided as disclosed.

As can be seen in FIGS. 1 and 2, the first chamber 101 and the second chamber 102 each comprise a door 121,122, to allow handling of inside objects. The supply means for supplying the first chamber 101 with particulate free air comprise an air control valve 10 coupled to a mass flow meter 13 which is fitted into the left front wall of the first chamber 101. A hose 12 is coupled to the mass flow meter 13 ends in a nozzle 11.

Figure 3:
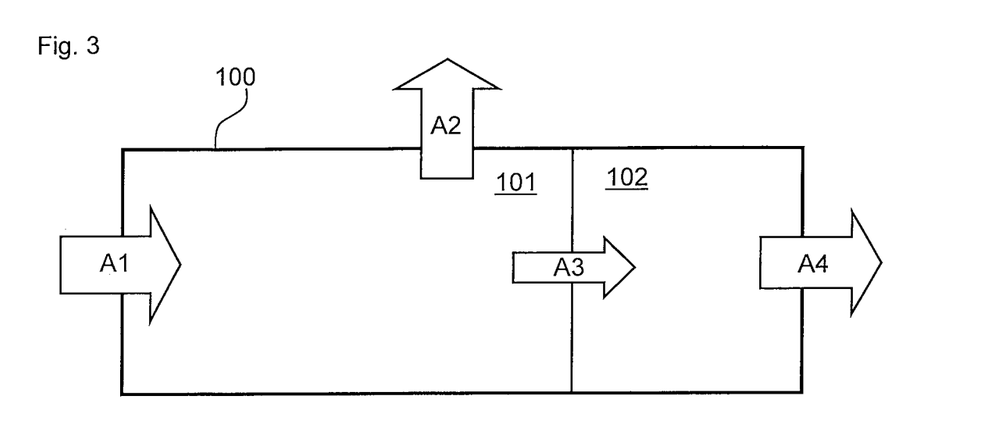
FIG. 3 shows a flow chart depicting air flows through the test apparatus
Figure 4:
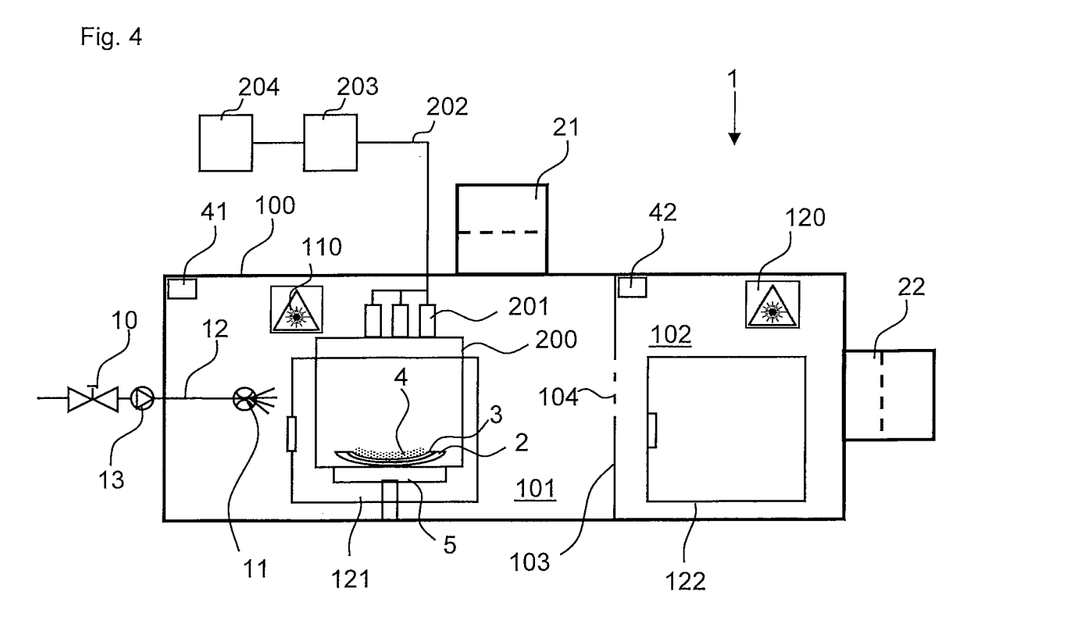
FIG. 4 shows a schematic side view of a test apparatus "wet dust cabinet" according to the invention with spray box and jets.

This arrangement allows the airflow A1, see FIG. 3, to be blown into the first chamber 101 under controlled conditions. The airflow A1 supplies clean air, or, respectively, dust free air.

To optimize controlling of the conditions in the first and second chambers 101,102, temperature probes 41,42 are installed; one in each chamber 101,102.

The arrangement of the test apparatus 1 of FIG. 1 provides the efficient filter units 21,22 in each of said chambers 101,102.

FIG. 2 then shows the test apparatus 1 of FIG. 1, but inside said first chamber 101 a vibrating table 5 as test object holder is installed, and the test object, herein a test dish 2 having a coating 3 and being laden with dust particulates 4, is placed (through the door 121) onto said table 5.

To perform test measurements, the first chamber 101 is now fed with dust free air (airflow A1, see FIG. 3) using the mass flow meter 13 and activating valve 10. The airflow A1 exits through a flat nozzle 11 fixed at the hose 12 which is coupled to the mass flow meter 13. Using said nozzle 11, advantageously the angle of attack of airflow A1 directed onto the test dish 2 can be varied to a suitable fixed position. During measurements, temperature probes 41,42 record the air temperature in both chambers 101,102. The mass flow meter 13 is calibrated such that the air velocity of airflow A1 can be accurately determined at the point of exit from the nozzle 11.

In the absence of any test object which can release dust particulates, the cleanliness of the inside of the first chamber 101 and the second chamber 102 is confirmed through the use of the calibrated particle counter 110,120, which is placed in a fixed position in the "clean chambers 101,102". Before any measurement the still empty chambers 101,102 are calibrated as such, in order to determine any dust background and ensure a preset cleanliness. Once background cleanliness is established, the door 121 is opened and the test dish 2 is placed on the table 5 (which can be vibrated).

Measurement starts: The air is turned on (airflow A1) and the particle counter 120 is started in the second chamber 102. Air from airflow A1 blows over the test dish and particulates 4 become airborne. This particulate laden airflow A1 flows towards the window 103, becoming an airflow which separates in the airflow A3, passing the transfer vent 104 and entering the second chamber 102, and in the airflow A2, which leads the excess air into the effective dust filter unit 21 of the first chamber 101 preventing dust to pollute the environment of the test apparatus 1.

Airflow A3, which flows from the side with the test dish 2 (first chamber 101) to the particle counting second chamber 102, is analysed and the release of particulates 4 is quantified by the particle counter 120 in said second chamber.

In order to determine a relation of particulates 4 having become airborne and particulates 4 having been retained on the test object, it is advisable to predetermine the amount of particles by weighing said particulates 4 beforehand. Of course mixtures of different particle size ranges can be provided. Further it is possible to design the first chamber 101 as glove box or to put the whole test apparatus into a glove box.

The particle counter 120 records the live particulates 4 versus time. The level of dust is herein quantified over four dust size ranges ranging from 0 to 1 µm, over 1 µm to 2.5 µm, over 2.5 µm to 5 µm and from over 5 µm to 10 µm. Of course, other ranges may be selected. Temperature is measured in the second chamber 102, too. Finally, the air in the second chamber 102 flows as airflow A4 through the second filter unit 22 and clean air exits the test apparatus 1.

By measuring the build-up of particles the ability of the test coating 3 or of any test system can be quantified against time, temperature, air velocity and mechanical vibration level, a calculation can be made of the effectiveness of the test coating or treatment to a known substance to give an efficiency in percent. A combination of the listed equipment of the test apparatus combined with a data capture system and display enables to store and visualize data and display real time information on quantity and size range of airborne particulates generated.

FIG. 4 shows the schematic side view of a test apparatus “wet dust cabinet” 1' with a spray box 200 and three jets 201. Via the tubing 202, the jets 201 are connected to the fluid reservoir 203 which contains water or a fluid being a mixture of water and the dust suppression chemicals to be tested. The fluid reservoir 203 is coupled to the compressor 204, which provides the necessary pressure for the fluid to be injected into the spray box 200 via jets 201. This “wet dust cabinet” 1' helps analysing dust suppression fluids by capturing dust. Herein, the dust suppression fluid is pumped under air pressure into the spray box 200 to the spray jet system comprised of said jets 201, the spray interacts with the dust, wets it and brings it down, so reduces the level of airborne dust reaching the particle counter 120.

Tests can be made dry, without the spray (with “dry dust cabinet”), then with water (with “wet dust cabinet”), then with the dust suppression treated water.

Figure 5A:
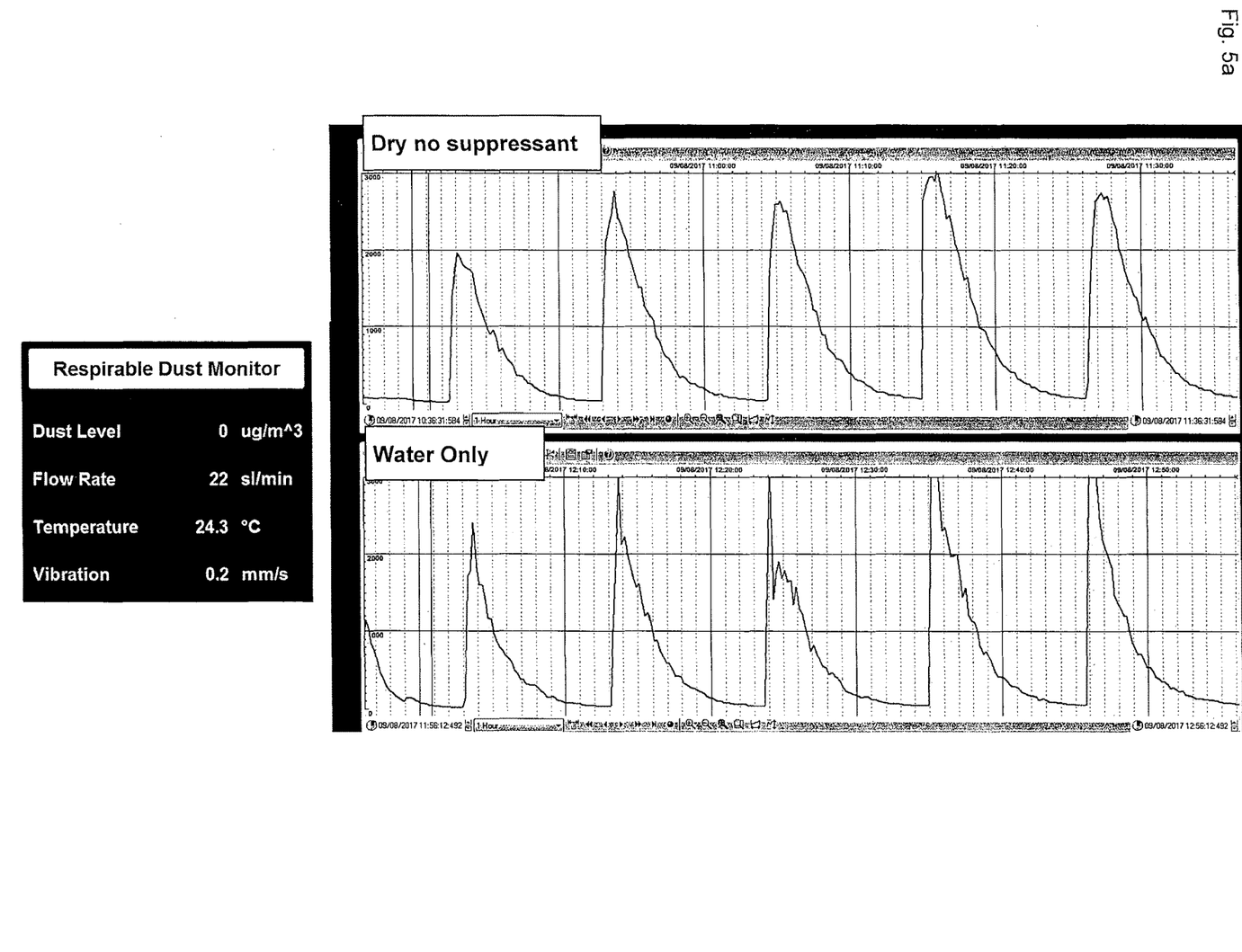
FIG. 5a shows a comparison of measurements with and without dust suppression fluid (water)
Figure 5B:
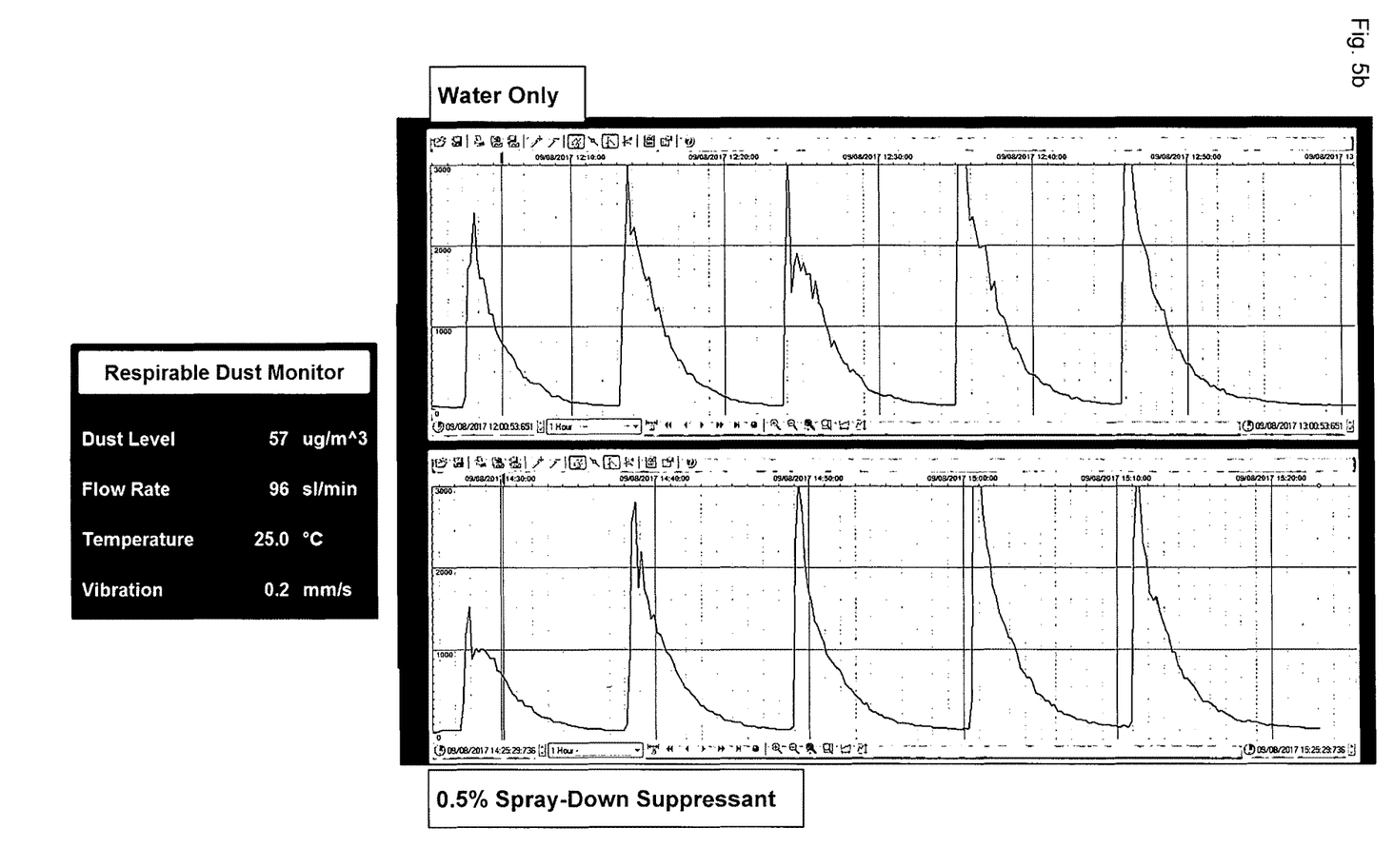
FIG. 5b shows a comparison of measurements with and without dust suppression fluid (spray down suppressant).

FIGS. 5a and 5b show the comparison of the area of the respective graph related to "dry, no suppressant" and "water only", see FIG. 5a, and to "water only and 0.5% Spray-Down suppressant" of FIG. 5b. So, by comparing the graphs, the effectiveness of the fluid and thus its effectiveness in dust suppression can be determined. Comparison parameters might be peak height, peak area, location of peak and relation of peaks; particle counts versus time.

So, the invention provides a laboratory and demonstration apparatus which can quantify the effectiveness of dust suppression systems using a controlled measured airflow, vibration and particle counter combination.

REFERENCE NUMERALS

1 Test apparatus
1' Wet dust cabinet
2 Test dish
3 Coating
4 Particles
5 Table
10 Air control valve
11 Nozzle
12 Hose
13 Mass flow meter
21 First filter unit
22 Second filter unit
41 First temperature probe
42 Second temperature probe
100 Housing
101 First chamber
102 Second chamber
103 Separating window
104 Transfer vent
110 Particle counter of first chamber
120 Particle counter of second chamber
121 Door
122 Door
200 Spray box
201 Jet
202 Tube
203 Fluid Reservoir (water, dust suppression fluid)
204 Air Compressor
A1 Airflow into first chamber
A2 Airflow into first filter unit
A3 Airflow from first chamber into second chamber
A4 Airflow into second filter unit CLAIMS

What is claimed is:

1. Test apparatus (1) for testing a dust suppression system, said test apparatus (1) comprising a housing (100) with
two chambers (101,102) being separated from each other by a window (103) which comprises at least one transfer vent (104), wherein
particle counting means (110,120) are detachably mounted to at least one of said two chambers (101, 102),
and wherein
a first chamber (101) of said two chambers (101,102) comprises a door (121) and is equipped with supply means for supplying the first chamber (101) with particulate free air, and wherein the first chamber (101) is configured to receive a dust-comprising test object, wherein the dust-comprising test object is provided with the dust suppression system to be tested, and wherein a second chamber (102) of said two chambers (101,102) is equipped with exit means for releasing air from the second chamber (102);
wherein the at least one transfer vent (104) is a rotating air vent (104).

2. Test apparatus (1) according to claim 1, characterized in that
at least one of the two chambers (101,102) comprises air filter means.

3. Test apparatus (1) according to claim 1, characterized in that
at least one of the two chambers (101,102) comprises a temperature measuring device.

4. Test apparatus (1) according to claim 1, characterized in that
inside the first chamber (101) a holding device for holding a test object comprising dust is arranged.

5. Test apparatus according to claim 4,
wherein said holding device is a table (5), selected from a movable table or a vibrating table, and wherein said dust comprising test object is a plate or a dish (2).

6. Test apparatus according to claim 4,
wherein said holding device comprises at least one of a table (5), a tube, or a spray box or a combination of two components selected from the table (5), the tube or the spray box.

7. Test apparatus (1) according to claim 4,
characterized in that
the holding device comprises a rectangular spray box comprising at least one spray jet and the holding device further comprises a vibrating table coupled to a vibration sensor.

8. Test apparatus (1) according to claim 4, characterized in that
the holding device is a rectangular spray box comprising at least one spray jet, or the holding device (5) is a vibrating table coupled to a vibration sensor.

9. Test apparatus (1) according to claim 1, characterized in that
the particle counting means (110,120) is an optical particle counter.

10. Test apparatus according to claim 9,
wherein the optical particle counter is a laser particle counter (110,120).

11. Test apparatus (1) according to claim 1, characterized in that
the housing (100) is, at least partially, made of a transparent material selected from glass or a glassy polymer.

12. Test apparatus (1) according to claim 1, characterized in that
the supply means for supplying the first chamber (101) with particulate free air comprise
an air control valve (10) coupled to
a mass flow meter (13) which is fitted into a wall of the housing (100) constituting the first chamber (101), and
a hose (12) being coupled to the mass flow meter (13).

13. Test apparatus according to claim 1,
wherein the first chamber (101) comprises a first filter unit (21) fit into a wall of the housing (100) constituting the first chamber (101) and wherein the second chamber (102) comprises a second filter unit (22) fit into a wall of the second chamber (102), wherein the second filter unit (22) is said exit means.

14. Test apparatus (1) according to claim 1,
wherein the first chamber comprises a first temperature probe and the second chamber comprises a second temperature probe.

15. Method for testing dust suppression systems using a test apparatus (1) comprising a housing (100) with
two chambers (101,102) being separated from each other by a window (103) which comprises at least one transfer vent (104), wherein
particle counting means (110,120) are detachably mounted to at least one of said two chambers (101.102),
and wherein
a first chamber (101) of the two chambers (101,102) comprises a door (121) and is equipped with supply means for supplying the first chamber (101) with particulate free air, and wherein the first chamber (101) is configured to receive a dust-comprising test object, wherein the dust-comprising test object is provided with the dust suppression system to be tested, and wherein
a second chamber (102) of said two chambers (101,102) is equipped with exit means for releasing air from the second chamber (102);
the method comprising the steps of
a) providing the housing (100) with the first chamber (101) and the second chamber (102) and
b) placing the dust comprising test object provided with the dust suppression system and a weighed amount of dust particulates inside the first chamber (101),
c) providing a particulate free air flow (A1) into the first chamber (101), thereby disturbing releasable dust particulates (4) from the dust comprising test object, and providing an airflow (A3) comprised of the particulate free air flow (A1) and air borne dust particulates (4),
d) allowing the airflow (A3) to pass the transfer vent (104) in a controlled way and to enter the second chamber (102),
e) activating the particle counter (120) at the second chamber (102) and quantifying dust particulates (4) in the airflow (A3), and
f) based on a number of quantified particulates (4) in relation to the weighed amount of dust particulates (4), determining an efficiency of dust retention of the dust comprising test object.

16. Method according to claim 15, comprising,
before performing step b),
the step b') of performing calibration of the first chamber (101) by using a first particle counter (110) at the first chamber (101) with no test object comprising dust inside, and counting particles; thus providing a particle background of the first chamber (101).

17. Method according to claim 16,
wherein
during performance of any of the steps b'), b) to e) punctually or continuously measuring a temperature of at least one of the two chambers (101,102).

18. Method according to claim 15,
wherein
airborne dust particulates (4) in the airflow (A3) or dust particulates (4) in the first chamber (102) with no test object comprising dust inside are quantified versus time.

19. Method according to claim 18, wherein the airborne dust particulates (4) in the airflow (A3) or the dust particulates (4) in the first chamber (102) are quantified over at least two particulate sizes.

* * * * *